United States Patent [19]

Bosen et al.

[11] Patent Number: 5,088,887
[45] Date of Patent: Feb. 18, 1992

[54] TURBINE WITH SPUR GEARING

[75] Inventors: Werner Bosen, Cologne; Hans-Dieter Denz, Weilerswist-Metternich, both of Fed. Rep. of Germany

[73] Assignee: Atlas Copco Energas GmbH, Cologne, Fed. Rep. of Germany

[21] Appl. No.: 483,511

[22] Filed: Feb. 21, 1990

[30] Foreign Application Priority Data

Mar. 4, 1989 [DE] Fed. Rep. of Germany ....... 3907068

[51] Int. Cl.$^5$ ............................................. F01D 15/00
[52] U.S. Cl. .................................. 415/124.1; 415/229
[58] Field of Search .................. 415/122.1, 129.1, 110, 415/111, 229, 216.1; 74/369, 372, 375

[56] References Cited

U.S. PATENT DOCUMENTS

| | | | |
|---|---|---|---|
| 877,523 | 1/1908 | Smith | 415/122.1 |
| 1,613,034 | 1/1927 | Janette | 415/122.1 |
| 1,998,778 | 4/1935 | Gregg | 415/122.1 |
| 2,757,856 | 8/1956 | Conan | 415/122.1 |
| 2,845,054 | 7/1958 | Palfreyman et al. | 415/122.1 |
| 2,847,186 | 8/1958 | Anderson et al. | 415/122.1 |
| 2,973,894 | 3/1961 | Kimball et al. | 415/122.1 |
| 3,001,692 | 9/1961 | Schierl | 415/122.1 |
| 3,498,424 | 3/1970 | Beneke et al. | 74/369 |
| 3,632,222 | 1/1972 | Cronstedt | 415/122.1 |
| 3,650,634 | 3/1972 | Osborne et al. | 415/122.1 |
| 4,648,808 | 3/1987 | Hauenstein | 415/206 |
| 4,687,411 | 8/1987 | Maeda et al. | 415/122.1 |
| 4,825,645 | 5/1989 | Bell, III | 415/122.1 |

FOREIGN PATENT DOCUMENTS 1198181 12/1959 France .
1101586 7/1984 U.S.S.R. ............................. 415/142

Primary Examiner—Edward K. Look
Assistant Examiner—Hoang Nguyen
Attorney, Agent, or Firm—Herbert Dubno; Andrew Wilford

[57] ABSTRACT

A turbine has a housing, an impeller centered on and rotatable about an axis in the housing, and a small-diameter bearing stem centered on the axis, fixed on the housing, and extending from an attachment location on the housing toward the impeller. A pinion traversed by the bearing stem is fixed to the impeller and forms with the impeller a rotor having a center of mass spaced axially a predetermined distance from the attachment location. A gear rotatable on the housing adjacent the axis and meshing with the pinion is supported on the stem by an inner bearing engaged between the pinion and the stem. An outer bearing supports the rotor on the stem of the axle assembly at a bearing location spaced from the attachment location by a distance equal to between 0.4 and 1.2 times the predetermined distance between the center of mass and the attachment location.

5 Claims, 2 Drawing Sheets

FIG.I

TURBINE WITH SPUR GEARING

FIELD OF THE INVENTION

The present invention relates to a turbine. More particularly this invention concerns a turbine provided with spur gearing.

BACKGROUND OF THE INVENTION

A standard turbine has a cantilevered impeller and a spur transmission comprising a transmission housing, a small-diameter pinion fixed rotationally to the impeller, and an output spur gear meshing with the pinion and rotatable on the housing about an axis parallel to the impeller axis. Normally the impeller and the pinion are carried on an output shaft that itself is supported in the housing in a bearing which is arranged between the impeller and the pinion. Such a bearing takes up considerable space and is a difficult item to manufacture to the necessary tolerances. In addition for a given weight and mass of the impeller only a limited range of constructions are possible to influence the critical speed.

The result is that such turbines must be built to fairly limited standards. The known turbines, in particular radial-throughput ones, are run in a supercritical range at very high speeds so that an acceptable service life of the spur gearing can only be obtained by mounting the output shaft on a bearing that is both cooled and lubricated by oil. Oil-lubricated bearings produce considerable friction at high speeds, which friction negatively affects turbine performance and requires an expensive oil-pumping and -cooling arrangement.

OBJECTS OF THE INVENTION

It is therefore an object of the present invention to provide an improved spur-gear turbine.

Another object is the provision of such an improved spur-gear turbine which overcomes the above-given disadvantages, that is which is of compact construction and which in a simple manner makes it possible to constructively influence the critical rotation speeds.

SUMMARY OF THE INVENTION

A turbine according to this invention has a housing, an impeller centered on and rotatable about an axis in the housing, and a small-diameter bearing stem centered on the axis, fixed on the housing, and extending from an attachment location on the housing toward the impeller A pinion traversed by the bearing stem is fixed to the impeller and forms with the impeller a rotor having a center of mass spaced axially a predetermined distance from the attachment location. A gear rotatable on the housing adjacent the axis and meshing with the pinion is supported on the stem by an inner bearing engaged between the pinion and the stem. An outer bearing supports the rotor on the stem of the axle assembly at a bearing location spaced from the attachment location by a distance equal to between 0.4 and 1.2 times the predetermined distance between the center of mass and the attachment location.

For a predetermined operating speed the critical speed is changeable via the dimensions of the small-diameter bearing stem of the shaft as well as of the hub rotor, in particular its length, wall thickness, and diameter In addition it is possible by appropriate selection of the bearing spacing in accordance with the invention to affect the critical rotation speed. As a result the critical speed can be varied considerably by simple constructive changes which do not affect the basic construction. A wide range of acceptable critical speeds can be obtained with low bearing speed. The result of this is that instead of the normally provided oil-lubricated bearing, roller bearings—normally a prestressed inclined ball or spindle bearing—can be used for supporting the rapidly rotating hub rotor. Even though it is within the scope of this invention to provide a sliding-type journal bearing on the reduced-diameter shaft part and to drive the turbine above the first critical rotation speed and at a high bearing speed, the preferred embodiment of the invention provides that the bearing supporting the hub rotor has at least one roller bearing and the bearing spacing is set in accordance with the dimensions of the central axle and of the hub rotor so that the drive speed lies at a certain distance from neighboring critical speeds. This arrangement, whereby the use of slide bearings is completely eliminated, is particularly simple and inexpensive to manufacture and operate and has very low losses.

According to another feature of this invention the outer bearing is a roller bearing and the distance between it and the mounting part is set in accordance with the dimensions of the axle assembly and rotor such that its drive speed is different from the critical rotation speed of the rotor.

The impeller according to this invention can be formed with a sleeve on which the pinion is mounted directly. This maximizes the wall thickness around the central hole in the impeller to similarly increase its strength. Alternately the pinion is formed with a sleeve on which the impeller is mounted directly.

DESCRIPTION OF THE DRAWING

The above and other objects, features, and advantages will become more readily apparent from the following, reference being made to the accompanying drawing in which.

SPECIFIC DESCRIPTION

Figure 1:
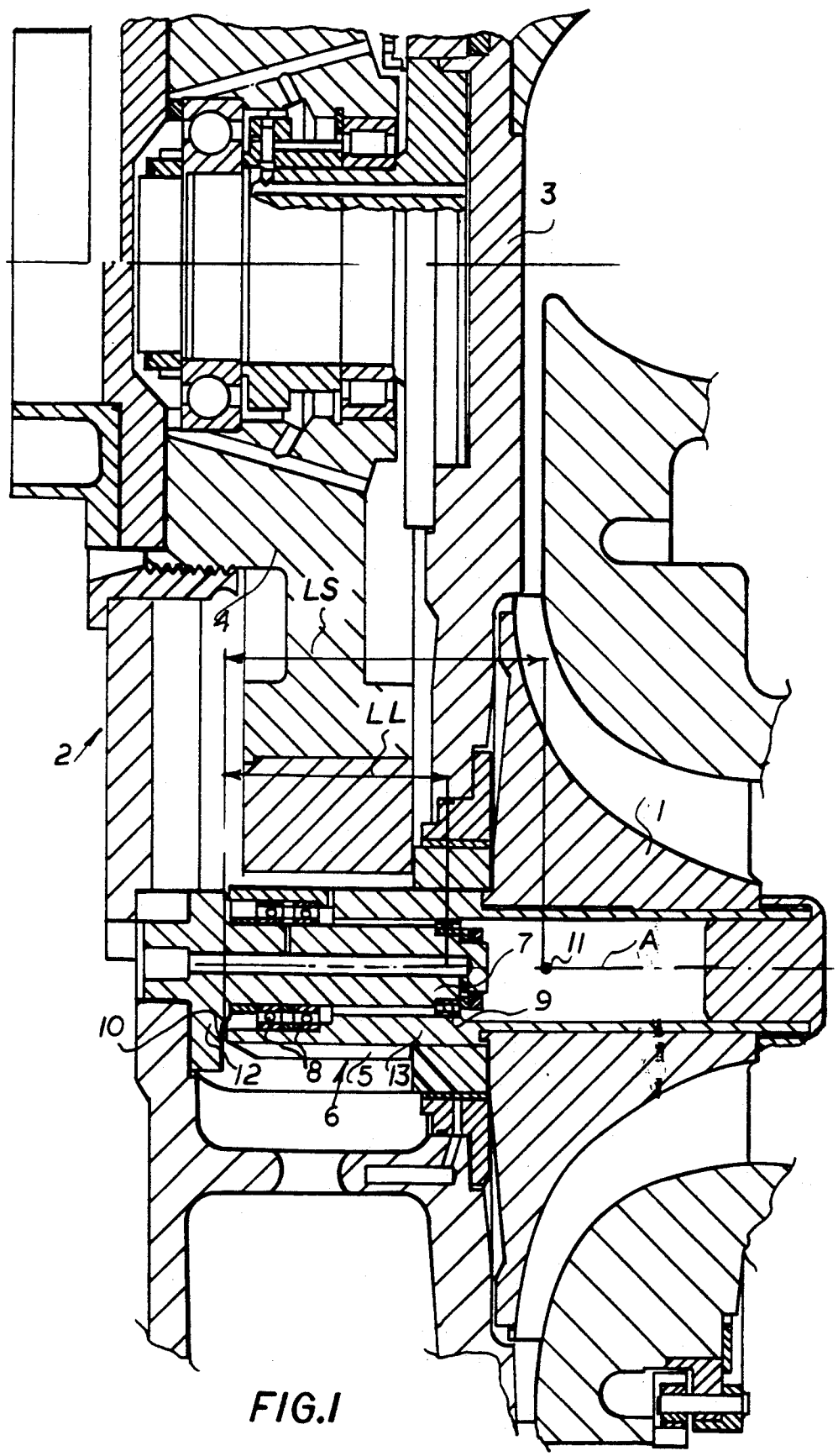
FIG. 1 is an axial section through a turbine according to this invention.

As seen in FIG. 1 an impeller 1 which is cantilevered, that is supported at only one end, is connected to a spur transmission 2 comprised of a nonrotating housing 3, a spur gear 4 rotatable on the housing 3 about an axis parallel to the axis A of the impeller, and a pinion 5. This arrangement can be used as a pump or a motor, but either way relies on radial flow over vanes of the impeller 1 for conversion of fluid flow into rotation.

The housing 3 is provided on the axis A with a small-diameter cylindrical bearing stem 7 provided with a first or inner roller bearing 8 within the gear 4 and with a second bearing 9 lying to the other side of this gear 4. The impeller 1 and pinion 6 are fixed together to form a hub rotor 6 having a center of gravity or mass at 11.

According to the invention the center of the bearing 9 is spaced along the stem 7 from the attachment location 10 by a distance LL equal to between 0.4 and 1.2 times the distance LS by which the center of mass 15 is spaced from this location 10. This bearing 9, which here is a double prestressed inclined-roller bearing, is in the illustrated embodiment very close to the center of mass 11. The operating speed of the turbine is different from the critical rotation speed of the rotor 6.

In the arrangement of FIG. 1 the impeller is unitarily formed with a sleeve 13 on which the pinion 6 is directly mounted. This arrangement is advantageous for a wide range of operation speeds.

Figure 2:
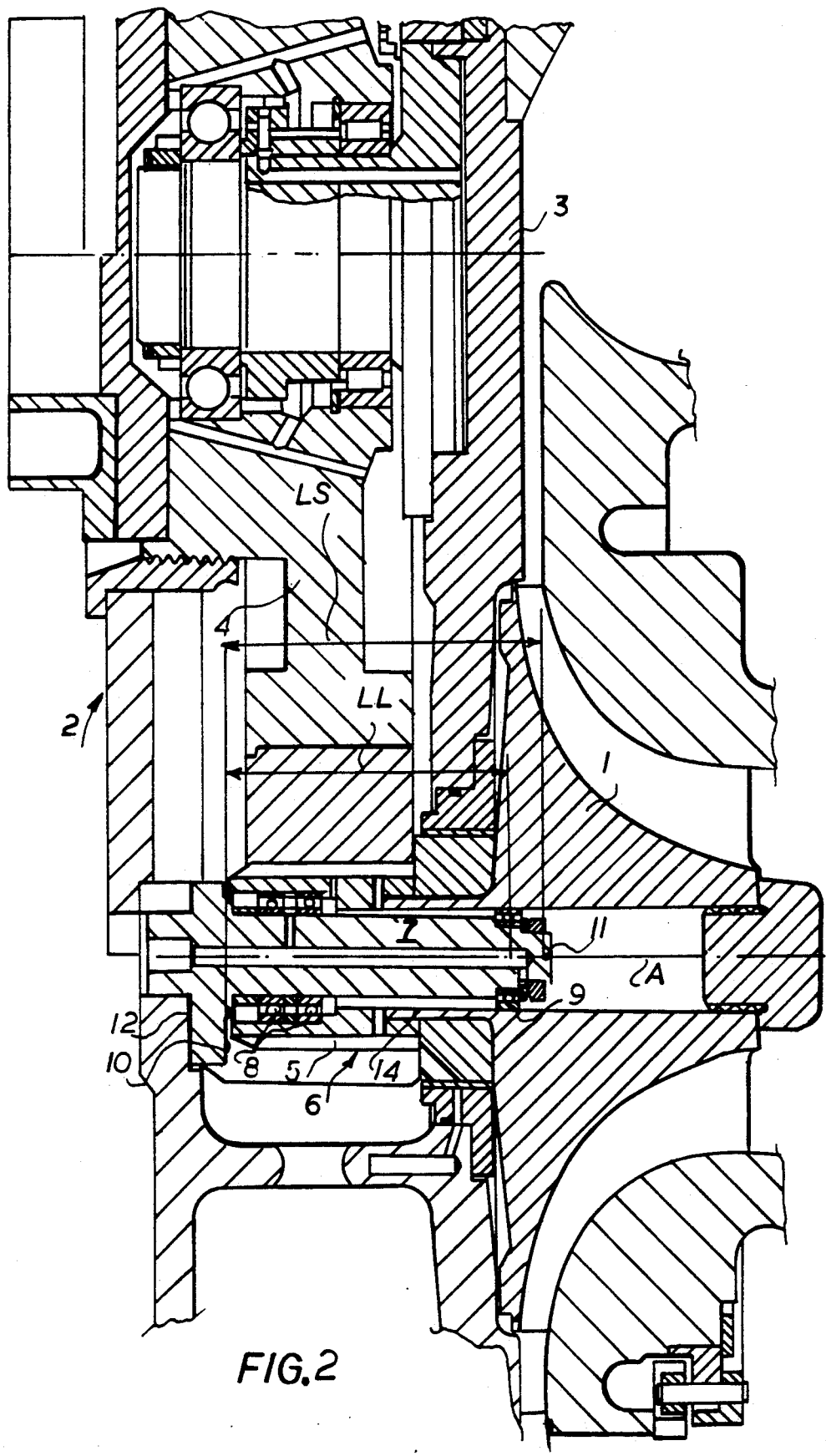
FIG. 2 is a view like FIG. 1 of another turbine in accordance with the invention.

FIG. 2 shows an arrangement for use where the impeller 1 is subjected to less centrifugal force. Here the impeller 1 is carried on a sleeve 14 formed unitarily with the pinion 6 and carrying the bearing 9.

We claim:

1. A turbine comprising:
   a housing;
   a cantilevered impeller centered on and rotatable about an axis in the housing;
   a small-diameter bearing stem centered on the axis, axially and rotationally fixed on the housing, and extending from an attachment location on the housing toward the impeller;
   a pinion traversed by the bearing stem, fixed to the impeller, and forming with the impeller a rotor having a center of mass spaced axially a predetermined distance from the attachment location, the stem projecting axially into and at least partially through the rotor;
   a spur-transmission spur gear rotatable on the housing adjacent the axis and meshing with the pinion;
   an inner bearing engaged between the pinion and the stem and rotatably supporting the pinion on the stem; and
   an outer bearing supporting the rotor rotatably on the stem at a bearing location spaced from the attachment location by a distance equal to between 0.4 and 1.2 times the predetermined distance between the center of mass and the attachment location, the distance being such that the critical rotation speed of the turbine is different from the drive speed of the turbine.

2. The turbine defined in claim 1 wherein the outer bearing is a roller bearing.

3. The turbine defined in claim 1 wherein the impeller is formed with a sleeve on which the pinion is mounted directly.

4. The turbine defined in claim 1 wherein the pinion is formed with a sleeve on which the impeller is mounted directly.

5. The turbine defined in claim I wherein the pinion lies between the outer bearing and the attachment location.

* * * * *